United States Patent Office 3,770,767
Patented Nov. 6, 1973

3,770,767
2-AMINOMETHYLINDOLE DERIVATIVES
Hisao Yamamoto, Noshinomiya, Shigeho Inaba, Takarazuka, Tadashi Okamoto, Ashiya, Toshiyuki Hirohashi, Kobe, Kikuo Ishizumi, Minoo, Michihiro Yamamoto, Takarazuka, Isamu Maruyama, Minoo, Kazuo Mori, Kobe, and Tsuyoshi Kobayashi, Minoo, Japan, assignors to Sumitomo Chemical Company, Ltd., Osaka, Japan
No Drawing. Original application Nov. 20, 1968, Ser. No. 777,458, now Patent No. 3,652,551. Divided and this application Nov. 13, 1970, Ser. No. 89,480
Claims priority, application Japan, Dec. 28, 1967, 43/84,961
The portion of the term of the patent subsequent to Mar. 27, 1990, has been disclaimed
Int. Cl. C07d 27/56
U.S. Cl. 260—326.15          2 Claims

ABSTRACT OF THE DISCLOSURE

Benzodiazepine derivatives, which have been well known as excellent tranquilizers and which have the formula

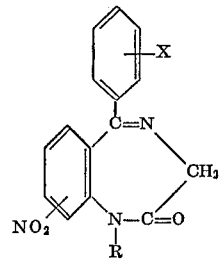

wherein R signifies a methyl, ethyl or the like group; and X signifies a hydrogen, chlorine or the like atom, are obtained by reacting with an oxidizing agent, such as chromic acid or the like, a novel 2-aminomethylindole derivative of the formula:

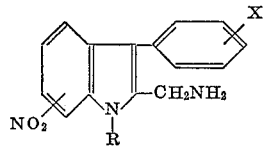

wherein R and X have the same significances as mentioned above, or its salt.

The starting 2-aminomethylindole derivative is prepared by reacting a nitrobenzenediazonium derivative of the formula:

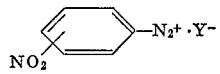

wherein Y signifies a halogen atom, with an ester of β-keto-acid of the formula:

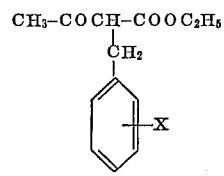

wherein X has the same significance as mentioned above, to form an indole-2-carboxylic acid ester derivative of the formula:

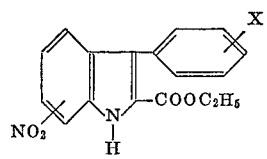

wherein X has the same significance as mentioned above, subjecting said derivative to N-alkylation, hydrolysis, and amidation to form a corresponding acid amide, dehydrating said acid amide to a corresponding carbonitrile, and then reducing said carbonitrile.

---

This application is a division of our co-pending application Ser. No. 777,458 filed November 20, 1968 now U.S. Patent 3,652,551.

BACKGROUND OF THE INVENTION

Field of the invention

This invention relates to a process for producing benzodiazepine derivative. More particularly, the invention pertains to process for preparing benzodiazepine derivatives which have prominent transquillizing, muscle-relaxant, spasmolytic and hypnotic effects, and which are represented by the formula:

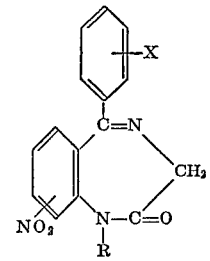

wherein R signifies a lower alkyl group having 1–4 carbon atoms; and X signifies a hydrogen or a halogen atom.

Prior arts

The benzodiazepine derivatives represented by the Formula I show potent tranquillizing muscle-relaxant, spasmolytic and hypnotic actions (cf. L.H. Sternbach et al.: J. Med. Chem., 6, 261). As methods for preparing said benzodiazepine derivatives, several processes have been known. For example, a benzodiazepine derivative is obtained in a poor yield by reacting a 2-aminobenzophenone derivative with glycine hydrochloride or ethyl glycinate (cf. German Pat. No. 1,145,629) and then alkylating (cf. L. H. Sternbach et al.: J. Med. Chem., 6, 261). A benzodiazepine derivative is also prepared by treating a bromoacetamide benzophenone derivative with ammonia and cyclizing (cf. German Pat. No. 1,136,709) the resulting aminoacetamide derivative and then alkylating (cf. L. H. Sternbach et al.: J. Med. Chem., 6, 261; German Pat. 1,136,709).

DISCLOSURE OF THE INVENTION

On the contrary to these procedures, to our astonishment, we have found that a benzodiazepine derivative having the Formula I can be prepared smoothly and economically in high yield and in high purity by reacting a 2-aminomethyl-indole derivative having the formula

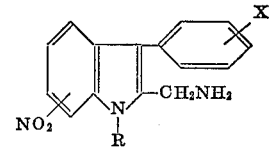

wherein R and X have the same meanings as defined above or its salt with an appropriate oxidizing agent. Such a process for converting a 5-membered ring compound into a 7-membered ring compound by ring expansion reaction has not heretofore been described or suggested in the literature. Therefore, the novel process of the present invention is unobvious from known methods, and moreover very much useful and unexpected procedure.

A novel starting 2-aminomethyldindole derivative is prepared easily by reduction of indole - 2-carboxamide derivative or indole-2-carbonitrile derivative. The novel indole-2-carbonitrile derivative is prepared by dehydration of the indole-2-carboxamide derivative. The indole-2-carboxamide derivative is also novel compound, which is prepared by the amidation of indole-2-carboxylic acid derivatives in good yield. Further, the indole-2-carboxylic acid derivative is obtained, for example, by cyclization of a benzene diazonium compound with an ester derivative of α-benzyl-β-keto acid.

All of these processes proceed smoothly and give the objective products in high yields, so these procedures are very much useful in practice.

One object of the present invention is to provide a novel process for preparing the benzodiazepine derivative represented by the Formula I.

Another object of the present invention is to provide the novel indole derivative and the novel phenylhydrazone derivative and the process for preparing the same.

Other objects of the present invention will be apparent from the following description.

In order to accomplish these objects, the present invention provides a process for preparing the benzodiazepine derivative represented by the Formula I, which comprises reacting the 2-aminomethylindole derivative represented by the Formula II or its salt with an oxidizing agent.

The 2-aminomethylindole derivative of the Formula II, which is used in the present invention, is novel compound and is synthesized from a known compound.

A synthesis schema for producing the benzodiazepine derivatives according to the present invention is shown as below, but it is to be understood that the synthesis schema is a mere example and the present process is not limited only to said synthesis course.

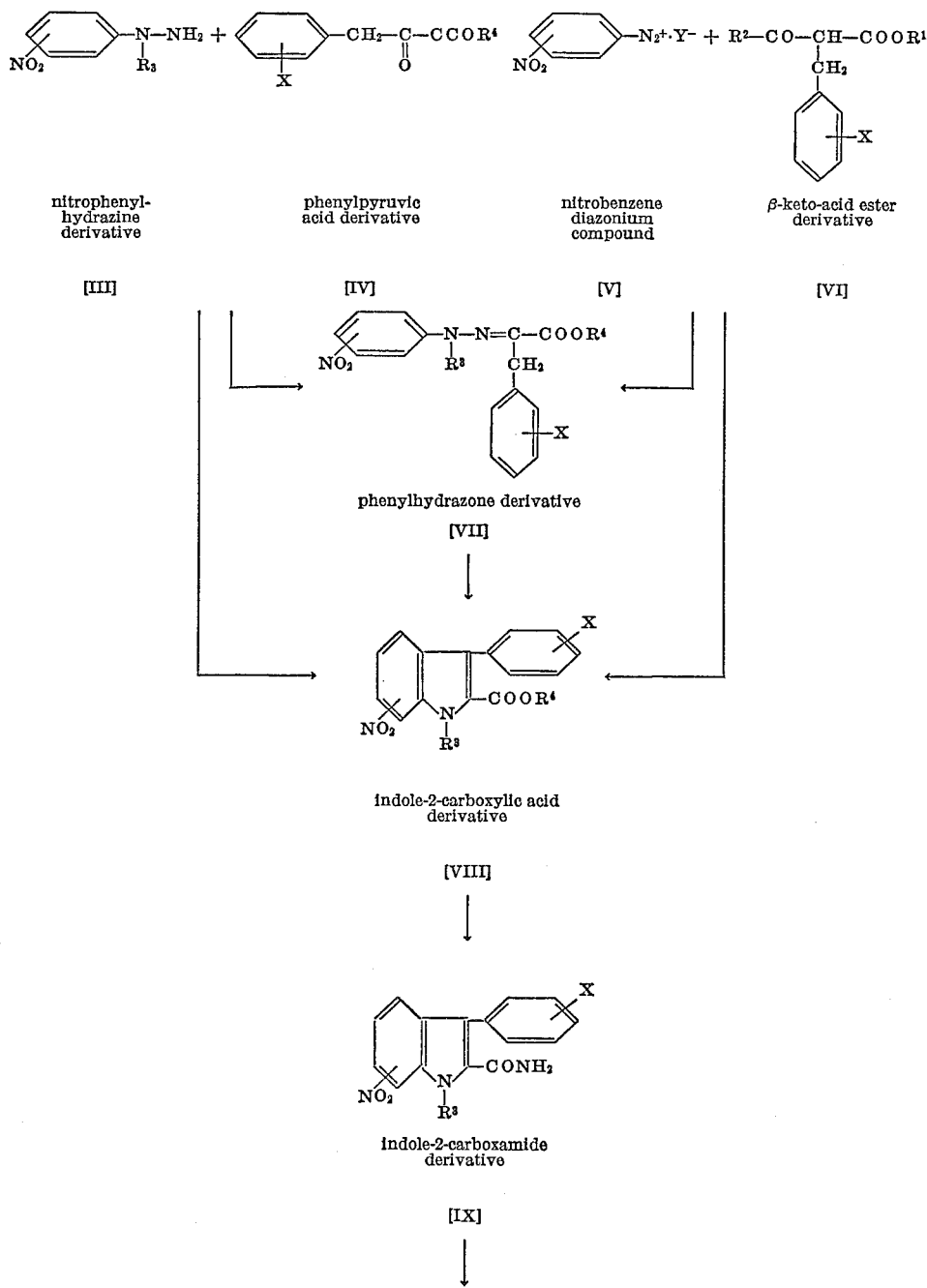

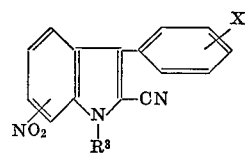

indole-2-carbonitrile
derivative

[X]

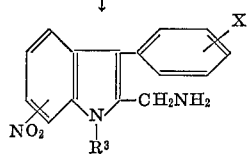

2-aminomethyl indole
derivative

[II]

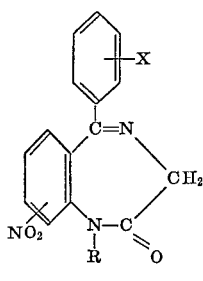

benzodiazepine
derivative

[I]

In the above equations, R, R¹ and R² individually signify same or different alkyl groups having 1–4 carbon atoms; R³ signifies a hydrogen atom or the same alkyl group as in the case of R; R⁴ signifies a hydrogen atom or the same alkyl group as in the case of R¹; X signifies a hydrogen or a halogen atom; and Y signifies a halogen atom.

The present process will be illustrated in detail below in the order of the above-mentioned synthesis procedures.

(I) Preparation of phenylhydrazone derivative [VII]: In the present invention, the phenylhydrazone derivative [VII] is prepared by reacting the phenylhydrazine derivative [III], or a salt thereof, with the phenylpyruvic acid derivative [IV].

The reaction is preferably carried out in the presence of an inert solvent such as lower alkanols, e.g. methanol, ethanol and the like organic acids, such as acetic acid and formic acid. The reaction temperature is not particularly limited, but is ordinarily within the range of from room temperature to the boiling point of the solvent employed. An acid salt of nitrophenylhydrazine includes an inorganic acid salt such as hydrochloride, hydrobromide or sulfate. The nitrophenylhydrazine [III] or a salt thereof is used in an equimolar amount or more of the phenylpyruvic acid derivative.

Examples of the phenylhydrazone derivatives [VII] obtained by process of the present invention, include the following compounds:

methyl phenylpyruvate p-nitrophenylhydrazone
ethyl phenylpyruvate p-nitrophenylhydrazone
tertiary butyl phenylpyruvate p-nitrophenylhydrazone
phenylpyruvic acid p-nitrophenylhydrazone
phenylpyruvic acid m-nitrophenylhydrazone
phenylpyruvic acid o-nitrophenylhydrazone
phenylpyruvic acid N'-methyl-p-nitrophenylhydrazone
(o-chlorophenyl)pyruvic acid p-nitrophenylhydrazone
(o-fluorophenyl)pyruvic acid p-nitrophenylhydrazone
(o-bromophenyl)pyruvic acid p-nitrophenylhydrazone
(p-chlorophenyl)pyruvic acid p-nitrophenylhydrazone
(m-chlorophenyl)pyruvic acid p-nitrophenylhydrazone
ethyl (o-chlorophenyl)pyruvate p-nitrophenylhydrazone.

Further, when the nitrobenzenediazonium compound [V] is allowed to react with the β-keto-acid ester derivative [VI], there is obtained the phenylhydrazone derivative represented by the formula:

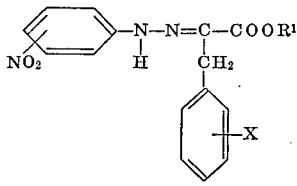

[VIIa]

wherein R¹ and X have the same significances as mentioned above.

The phenylhydrazone derivative [VIIa] may be obtained by reacting the ester of α-benzyl-β-keto-acid derivative [VI] with the nitrobenzenediazonium compound [V] in a suitable solvent, e.g. water, methanol, ethanol or the like, in the presence of a base, e.g. caustic soda, caustic potash, potassium carbonate, sodium methylate, sodium ethylate, sodium acetate, potassium acetate or the like. The reaction proceeds smoothly.

Because of unstability of the diazonium compound, the reaction can be preferably carried out below 10° C., more preferably below 5° C.

Examples of the phenylhydrazone derivative [VIIa] obtained by the process of the present invention include the following compounds:

methyl phenylpyruvate p-nitrophenylhydrazone
ethyl phenylpyruvate p-nitrophenylhydrazone
tertiary butyl phenylpyruvate p-nitrophenylhydrazone
ethyl phenylpyruvate m-nitrophenylhydrazone
ethyl (o-chlorophenyl)pyruvate p-nitrophenylhydrazone
ethyl(o-bromophenyl)pyruvate p-nitrophenylhydrazone
ethyl (o-fluorophenyl)pyruvate p-nitrophenylhydrazone
ethyl (p-chlorophenyl)pyurvate p-nitrophenylhydrazone
ethyl (m-chlorophenyl)pyruvate p-nitrophenylhydrazone.

Although two steric isomers of the phenylhydrazone derivative [VII] are observed, the both isomers can be used for the next reaction step.

(II) Preparation of indole-2-carboxylic acid derivative [VIII]: The indole-2-carboxylic acid derivative [VIII] is prepared by heating the phenylhydrazone derivative [VII] with an acid in a solvent.

As solvents, there may be employed lower alkanols such as methanol, ethanol, isopropanol and tertiary butanol, aromatic solvents such as benzene, toluene, xylene, organic acids such as formic acid and acetic acid or other organic solvent and an organic acid such as formic or acetic acid, or an alcohol is particularly preferable for the reaction.

As the acid, there is used, for example, a mineral acid such as hydrochloric acid, hydrobromic acid, sulfuric acid, phosphoric acid and polyphosphoric acid, organic acid such as formic acid and acetic acid or other acidic reagents, including Lewis acids such as zinc chloride, iron chloride, aluminum chloride and boron fluoride. The reaction is generally effected at elevated temperature.

If, in the above case, a phenylhydrazone derivative of the formula:

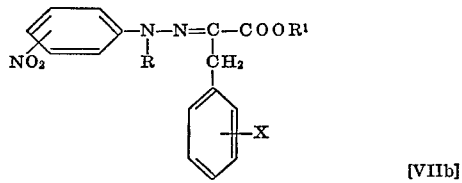

[VIIb]

wherein R, R¹ and X have the same significances as mentioned above, is used, there is obtained an indole-2-carboxylic acid derivative represented by the formula:

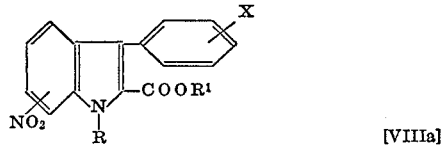

[VIIIa]

wherein R, R¹ and X have the same significances as mentioned above. Further, if a phenylhydrazone derivative of the Formula VII, in which R³=R and R⁴=H (such phenylhydrazone derivative will be represented by [VIIc]) is used, there is obtained an indole-2-carboxylic acid derivative having the formula:

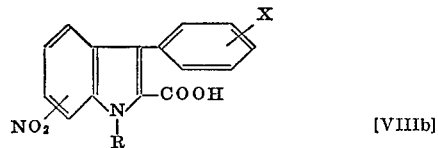

[VIIIb]

wherein R and X are as mentioned above.

The indole-2-carboxylic acid derivative [VIII] can also be directly obtained, by reacting the nitrophenylhydrazine [III], or a salt thereof, with the phenylpyruvic derivative [IV].

The reaction can be carried out in a solvent, for example, an alkanol such as methanol, ethanol, isopropanol and tertiary butanol, aromatic hydrocarbon such as benzene, toluene, xylene and the like, organic acid such as formic acid and acetic acid and the like, or another inert organic solvent and the like, preferably in the presence of an acid catalyst, for example, mineral acid such as hydrochloric acid, hydrobromic acid, sulfuric acid, phosphoric acid, polyphosphoric acid and the like, organic acid such as formic acid and acetic acid, Lewis acid such as zinc chloride, iron chloride, aluminum chloride, boron fluoride and the like, or cation exchange resin.

As the salt of phenylhydrazine derivative [III], there may be used, for example, an inorganic salt such as hydrochloride, hydrobromide or sulfate; or an organic acid salt such as acetate or oxalate The reaction is effected under conditions similar to that of the above-mentioned preparation from the phenylhydrazone derivative to 2-carboxylic acid derivative [VIII]. However, when the reaction is carried out under mild conditions, the phenylhydrazone derivative [VII] is obtained. In this case, isolation of the compound [VII] is not necessarily required for this cyclization reaction.

In the present invention, examples of the indole - 2-carboxylic acid derivative [VIII] include the following compounds:

5-nitro-3-phenylindole-2-carboxylic acid
methyl 5-nitro-3-phenylindole-2-carboxylate
ethyl 5-nitro-3-phenylindole-2-carboxylate
tertiary butyl 5-nitro-3-phenylindole-2-carboxylate
6 (or 4)-nitro-3-phenylindole-2-carboxyiic acid
7-nitro-3-phenylindole-2-carboxylic acid
3-(o-chlorophenyl)-5-nitroindole-2-carboxylic acid
3-(o-fluorophenyl)-5-nitroindole-2-carboxylic acid
3-(o-bromophenyl)-5-nitroindole-2-carboxylic acid
3-(m-chlorophenyl)-5-nitroindole-2-carboxylic acid
3-(p-chlorophenyl)-5-nitroindole-2-carboxylic acid
1-methyl-5-nitro-3-phenylindole-2-carboxylic acid
1-ethyl-5-nitro-3-phenylindole-2-carboxylic acid
1-propyl-5-nitro-3-phenylindole-2-carboxylic acid
3-(o-chlorophenyl)-1-methyl-5-nitroindole-2-carboxylic acid
3-(o-fluorophenyl)-1-methyl-5-nitroindole-2-carboxylic acid.

If, in the above case, a nitrophenylhydrazine derivative of the formula:

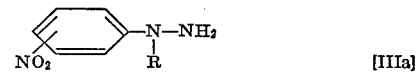

[IIIa]

wherein R has the same significance as mentioned above, and a phenylpyruvic acid derivative of the formula:

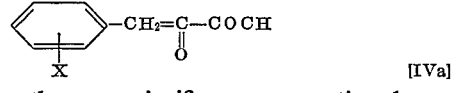

[IVa]

wherein X has the same significance as mentioned previously, are used, there is obtained the indole-2-carboxylic acid derivative [VIIIb].

Alternatively, an indole-2-carboxylic acid derivative represented by the formula:

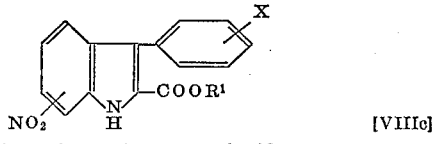

[VIIIc]

wherein R¹ and X have the same significances as mentioned above, can be obtained by reacting the nitrobenzene-diazonium compound [V] with the β-keto-acid ester derivative [VI].

In carrying out this process, the β-keto-acid ester derivative [VI] can be allowed to react with the nitrobenzene-diazonium compound [V] in the presence of a basic reagent, such as sodium hydroxide, potassium hydroxide, sodium acetate, potassium acetate, sodium methylate and sodium ethylate in an appropriate solvent, such as water, methanol and ethanol, whereby the reaction readily proceeds. Because of unstability of the benzenediazonium compound, it is preferable to carry out the reaction below 10° C., more preferably below 5° C. Thereafter, treatment of the reaction product with an acid causes formation of the indole - 2 - carboxylic acid ester derivative represented by the aforesaid Formula VIIIc. However, the reaction product is preferably isolated before the next step. Examples of the acids used in the process of the present invention include mineral acid such as hydrochloric acid, hydrobromic acid, sulfuric acid, phosphoric acid, polyphosphoric acid or the like, and other Lewis acid such as zinc chloride, ferrous chloride, aluminum chloride, stannous chloride, boron fluoride or the like.

In this reaction, examples of the solvents include, alkanols such as methanol, ethanol and isopropanol, aromatic hydrocarbons such as benzene, toluene and xylene, organic acids such as formic acid and acetic acid, and other organic solvents.

In the present invention, examples of the indole-2-carboxylic acid derivative [VIIIc] include the following compounds:

methyl 5-nitro-3-phenylindole-2-carboxylate
ethyl 5-nitro-3-phenylindole-2-carboxylate
tertiary butyl 5-nitro-3-phenylindole-2-carboxylate
ethyl 6 (or 4)-nitro-3-phenylindole-2-carboxylate
ethyl 7-nitro-3-phenylindole-2-carboxylate
ethyl 3-(o-chlorophenyl)-5-nitro-3-indole-2-carboxylate
ethyl 3-(o-boromphenyl)-5-nitro-3-indole-2-carboxylate
ethyl 3-(o-fluorophenyl)-5-nitroindole-2-carboxylate
ethyl 3-(m-chlorophenyl)-5-nitroindole-2-carboxylate
ethyl 3-(p-chlorophenyl)-5-nitroindole-2-carboxylate.

According to the present process, it is also possible to obtain an indole - 2 - carboxylic acid derivative represented by the formula:

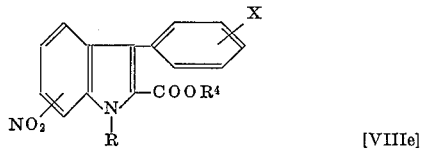

[VIIIe]

wherein R, $R^4$ and X have the same significances as mentioned above, by alkylating an indole-2-carboxylic acid derivative represented by the formula:

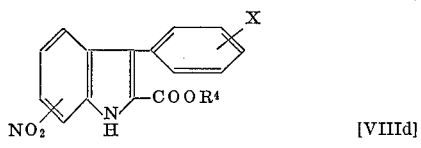

[VIIId]

wherein $R^4$ and X have the same significances as mentioned above.

This alkylation is carried out by treating an indole-2-carboxylic acid derivative represented by the Formula VIIId with an alkylating agent in the presence of an alkaline reagent or after the metal salt has been formed with the alkaline reagent. Alkaline reagents used in the process of the present invention include alkali metal, alkaline earth metal, alkali metal hydride, alkaline earth metal hydride, alkali metal hydroxide, alkaline earth metal hydroxide, alkali metal amide and alkaline earth metal amide.

Alkylation of an indole-2-carboxylic acid derivative represented by the Formula VIIId is carried out by treating it with the following compounds, for example, alkyl halide such as methyl iodide, ethyl bromide, ethyl iodide and butyl bromide, alkyl sulfate such as dimethyl sulfate and diethyl sulfate, such alkyl aromatic sulfonate as methyl paratoluenesulfonate, and such diazoalkane as diazomethane.

In the present invention, examples of the indole-2-carboxylic acid derivative [VIIIe] include the following compounds:

ethyl 1-methyl-5-nitro-3-phenylindole-2-carboxylate
methyl 1-methyl-5-nitro-3-phenylindole-2-carboxylate
ethyl 1-ethyl-5-nitro-3-phenylindole-2-carboxylate
ethyl 5-nitro-3-phenyl-1-propylindole-2-carboxylate
1-methyl-5-nitro-3-phenylindole-2-carboxylic acid
1-ethyl-5-nitro-3-phenylindole-2-carboxylic acid
1-methyl-6 (or 4)-nitro-3-phenylindole-2-carboxylic acid
1-methyl-7-nitro-3-phenylindole-2-carboxylic acid
3-(o-chlorophenyl)-1-methyl-5-nitroindole-2-carboxylic acid
3-(o-bromophenyl)-1-methyl-5-nitroindole-2-carboxylic acid
3-(o-fluorophenyl)-1-methyl-5-nitroindole-2-carboxylic acid
3-(m-chlorophenyl)-1-methyl-5-nitroindole-2-carboxylic acid
3-(p-chlorophenyl)-1-methyl-5-nitroindole-2-carboxylic acid.

Further, the indole-2-carboxylic acid derivative [VIIIb] can be obtained by the N-alkylation of an indole-2-carboxylic acid derivative of the formula:

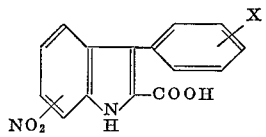

[VIIIj]

wherein X is as defined before.

In the present invention, it is also possible to convert an indole-2-carboxylic acid derivative of the formula:

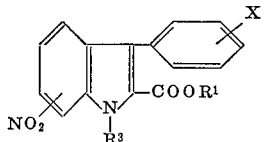

[VIIIf]

wherein $R^1$, $R^3$ and X have the same significances as mentioned above, to an indole-2-carboxylic acid derivative represented by the formula:

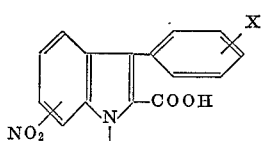

[VIIIg]

wherein $R^3$ and X have the same significances as mentioned above.

The indole-2-carboxylic acid derivative represented by the aforesaid Formula VIIIf is treated in water and/or an alkanol such as methanol and ethanol, preferably in the presence of a hydrolyzing agent, to give the indole-2-carboxylic acid derivative represented by the Formula VIIIg.

Examples of the hydrolyzing agents used in the present invention include mineral acid such as hydrochloric acid and sulfuric acid, alkali metal hydroxide such as sodium hydroxide and potassium hydroxide, alkali metal carbonate such as sodium carbonate and potassium carbonate, alkaline earth metal hydroxide such as barium hydroxide, and calcium hydroxide, and ammonium compound such as ammonium hydroxide or the like. Alkali metal hydroxide or alkaline earth metal hydroxide is preferred. The reaction can be carried out even at room temperature, preferably at an elevated temperature.

Furthermore, the indole-2-carboxylic acid ester derivative [VIIIf] can also be hydrolyzed to the indole-2-carboxylic acid derivative [VIIIg] by treating the same in an organic acid such as acetic acid and propionic acid, preferably in the presence of a mineral acid.

Alternatively, when $R^1$ is a tertiary butyl group, the indole-2-carboxylic acid derivative [VIIIf] can also be converted to the objective carboxylic acid [VIIIg] by heating the same with a mineral acid or toluenesulfonic acid.

In the present invention, examples of the indole-2-carboxylic acid derivative [VIIIg] include the following compounds:

5-nitro-3-phenylindole-2-carboxylic acid
6 (or 4)-nitro-phenylindole-2-carboxylic acid
7-nitro-3-phenylindole-2-carboxylic acid
3-(o-chlorophenyl)-5-nitroindole-2-carboxylic acid
3-(o-chlorophenyl)-1-methyl-5-nitroindole-2-carboxylic acid
3-(o-bromophenyl)-5-nitroindole-2-carboxylic acid
3-(o-fluorophenyl)-5-nitroindole-2-carboxylic acid
3-(o-fluorophenyl)-1-methyl-5-nitroindole-2-carboxylic acid
3-(m-chlorophenyl)-5-nitroindole-2-carboxylic acid
3-(p-chlorophenyl)-5-nitroindole-2-carboxylic acid
1-methyl-5-nitro-3-phenylindole-2-carboxylic acid
1-ethyl-5-nitro-3-phenylindole-2-carboxylic acid
1-propyl-5-nitro-3-phenylindole-2-carboxylic acid.

Further, in accordance with the present process, the indole-2-carboxylic acid derivative [VIIIc] can be converted to an indole-2-carboxylic acid derivative [VIIIb].

In the present invention, examples of the indole-2-carboxylic acid derivative [VIIIb] include the following compounds:

1-methyl-5-nitro-3-phenylindole-2-carboxylic acid
1-ethyl-5-nitro-3-phenylindole-2-carboxylic acid
1-methyl-6 (or 4)-nitro-3-phenylindole-2-carboxylic acid
1-methyl-7-nitro-2-phenylindole-2-carboxylic acid
1-propyl-5-nitro-3-phenylindole-2-carboxylic acid
3-(o-chlorophenyl)-1-methyl-5-nitroindole-2-carboxylic acid
3-(o-bromophenyl)-1-methyl-5-nitroindole-2-carboxylic acid
3-(o-fluorophenyl)-1-methyl-5-nitroindole-2-carboxylic acid
3-(m-chlorophenyl)-1-methyl-5-nitroindole-2-carboxylic acid
3-(p-chlorophenyl)-1-methyl-5-nitroindole-2-carboxylic acid (III) Preparation of indole-2-carboxamide derivative [IX]: According to the present process, the indole-2-carboxamide derivative [IX] is prepared by reacting the indole-2-carboxylic acid derivative [VIIIg] or a reactive derivative thereof with ammonia.

The reactive derivative referred to herein is an acid chloride, an acid anhydride or an ester.

The acid chloride is an indole-2-carboxylic halide derivative represented by the formula:

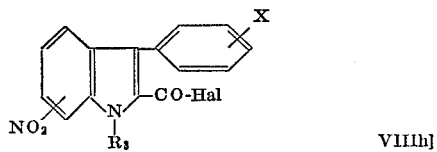

VIIIh]

wherein $R^{3\prime}$ and X have the same significances as mentioned above; and —Hal represents a halogen atom, and is obtained by reacting an indole-2-carboxylic acid derivative [VIIIg] with a halogenating agent in the presence or absence of a solvent.

In carrying out this process, the indole-2-carboxylic acid derivative represented by the aforesaid Formula VIIIg is treated with a halogenating agent in the absence of a solvent or in an inert solvent, such as benzene, toluene, ether, chloroform, methylene chloride and carbon tetrachloride.

Examples of the halogenating agents used in the process of the present invention include thionyl chloride, phosphorus trichloride, phosphorus tribromide, phosphorus pentachloride, phosphorus oxychloride and phosgene. In this case, some reaction can be promoted by adding a basic substance such as dimethylformamide. Further, both a free carboxylic acid and the metal salt can be used as a starting material in this process.

The objective product is obtained by removing the solvent and excess of the halogenating agent, if necessary, by means of extraction with an inert solvent. The isolation or purification of the indole-2-carboxylic halide derivative is not always necessary for converting it to the indole-2-carboxamide derivative.

The indole-2-carboxylic halide derivative having the Formula [VIIIh], in which $R^3$ is R, is referred to as an indole-2-carboxylic halide derivative [VIIIi].

According to the above-mentioned procedure, the chloride, bromide or the like is obtained.

In the present invention, examples of the indole-2-carboxylic halide derivative [VIIIh] include the following compounds:

5-nitro-3-phenylindole-2-carboxylic chloride
6 (or 4)-nitro-3-phenylindole-2-carboxylic chloride
1-methyl-5-nitro-3-phenylindole-2-carboxylic chloride
1-ethyl-5-nitro-3-phenylindole-2-carboxylic chloride
1-propyl-5-nitro-3-phenylindole-2-carboxylic chloride
7-nitro-3-phenylindole-2-carboxylic chloride
5-nitro-3-phenylindole-2-carboxylic bromide
3-(o-chlorophenyl)-5-nitroindole-2-carboxylic chloride
3-(o-bromophenyl)-5-nitroindole-2-carboxylic chloride
3-(o-fluorophenyl)-5-nitroindole-2-carboxylic chloride
3-(p-chlorophenyl)-5-nitroindole-2-carboxylic chloride
3-(m-chlorophenyl)-5-nitroindole-2-carboxylic chloride.

Esters of the indole-2-carboxylic acid derivative [VIIIg] used in the present invention include cyanomethyl ester and paranitrophenyl ester.

Acid anhydrides such as a mixed anhydride described in "Organic Reactions," vol. 12, p. 157 (1962) can be used.

An amidation of the indole-2-carboxylic acid derivative [VIIIg], or the reactive derivative thereof, is carried out by reacting the same with ammonia.

The amidation is advantageously effected in the presence of a solvent. Examples of the solvent usable in the process of the present invention include an alcohol such as methanol or ethanol, or an organic solvent such as ether, acetone, benzene, toluene, xylene, chlorobenzene or chloroform or ligid ammonia.

In the present reaction, ammonia can be used by introducing gaseous ammonia to a reaction mixture or adding alcoholic ammonia (such as methanolic ammonia, ethanolic ammonia) or aqueous ammonia to a reaction mixture.

Because the reaction usually proceeds at room temperature, heating or cooling is not always necessary. However, the reaction may be controlled by heating or cooling, if desired.

In the present invention, examples of the indole-2-carboxamide derivative [IX] include the following compounds:

5-nitro-3-phenylindole-2-carboxamide
6 (or 4)-nitro-3-phenylindole-2-carboxamide
7-nitro-indole-3-phenylindole-2-carboxamide
1-methyl-5-nitro-3-phenylindole-2-carboxamide
1-ethyl-5-nitro-3-phenylindole-2-carboxamide
1-propyl-5-nitro-3-phenylindole-2-carboxamide
3-(o-chlorophenyl)-5-nitroindole-2-carboxamide
3-(o-chlorophenyl)-1-methyl-5-nitroindole-2-carboxamide
3-(o-bromophenyl)-5-nitroindole-2-carboxamide
3-(o-fluorophenyl)-5-nitroindole-2-carboxamide
3-(o-fluorophenyl)-1-methyl-5-nitroindole-2-carboxamide
3-(p-chlorophenyl)-5-nitroindole-2-carboxamide
3-(m-chlorophenyl)-5-nitroindole-2-carboxamide.

Further, in the present invention, an indole-2-carboxamide of the formula:

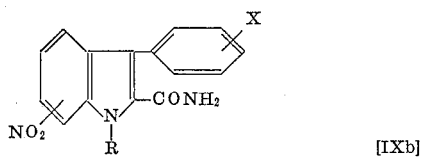

wherein R and X have the same significances as mentioned above, is obtained by alkylating an indole-2-carboxamide derivative represented by the formula:

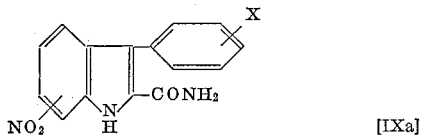

wherein X has the same significance as mentioned before. This N-alkylation can be effected in the manner similar to that of the aforesaid indole-2-carboxylic acid derivative [VIIId].

In the present invention, examples of the indole-2-carboxamide derivative [IXb] include the following compounds:

1-methyl-5-nitro-3-phenylindole-2-carboxamide
1-ethyl-5-nitro-3-phenylindole-2-carboxamide
1-propyl-5-nitro-3-phenylindole-2-carboxamide
3-(o-fluorophenyl)-1-methyl-5-nitroindole-2-carboxamide
3-(o-chlorophenyl)-1-methyl-5-nitroindole-2-carboxamide
3-(p-chlorophenyl)-1-methyl-5-nitroindole-2-carboxamide.

(IV) Preparation of indole-2-carbonitrile derivative [X]: In the present process, a novel indole-2-carbonitrile derivative [X] is produced by dehydrating a indole-2-carboxamide derivative [IX]. The dehydration of the indole-2-carboxamide [IX] is effected by heating the same in the presence of a dehydrating agent. Dehydrating agents used in the process of the present invention include a phosphorus halide such as phosphorus oxychloride, phosphorus trichloride or phosphorus pentachloride; or an acid chloride such as p-toluene-sulfonyl chloride, methyl sulfonyl chloride, acetyl chloride, thionyl chloride, benzoyl chloride or carbobenzyloxy chloride. The reaction is carried out in the presence or absence of a solvent. The dehydrating agent itself may be used as the solvent. After completion of the reaction, the desired product is obtained from the reaction mixture.

The following indole-2-carbonitrile derivatives [X] are obtained:

1-methyl-5-nitro-3-phenylindole-2-carbonitrile
1-ethyl-5-nitro-3-phenylindole-2-carbonitrile
1-propyl-5-nitro-3-phenylindole-2-carbonitrile
5-nitro-3-phenylindole-2-carbonitrile
6(or 4)-nitro-3-phenylindole-2-carbonitrile
7-nitro-3-phenylindole-2-carbonitrile
3-(o-chlorophenyl)-5-nitroindole-2-carbonitrile
3-(o-chlorophenyl)-1-methyl-5-nitroindole-2-carbonitrile
3-(o-bromophenyl)-5-nitroindole-2-carbonitrile
3-(o-fluorophenyl)-5-nitroindole-2-carbonitrile
3-(o-fluorophenyl)-1-methyl-5-nitroindole-2-carbonitrile
3-(p-chlorophenyl)-1-methyl-5-nitroindole-2-carbonitrile
3-(m-chlorophenyl)-5-nitroindole-2-carbonitrile.

According to the present process, an indole-2-carbonitrile derivative of the formula:

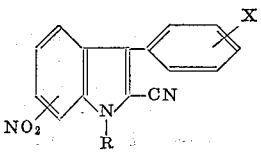

wherein R and X have the same significances as mentioned above, is also prepared by the N-alkylation of an indole-2-carbonitrile derivative represented by the formula:

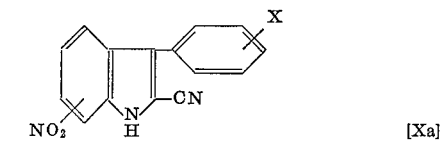

wherein X has the same significance as mentioned before. This N-alkylation is effected by the manner similar to that of the aforesaid indole-2-carboxylic acid derivative [VIIId].

In the present invention, examples of indole-2-carbonitrile derivative [Xb] include the following compounds:

1-methyl-5-nitro-3-phenylindole-2-carbonitrile
1-ethyl-5-nitro-3-phenylindole-2-carbonitrile
1-propyl-5-nitro-3-phenylindole-2-carbonitrile
3-(o-chlorophenyl)-1-methyl-5-nitroindole-2-carbonitrile
3-(o-fluorophenyl)-1-methyl-5-nitroindole-2-carbonitrile
3-(p-chlorophenyl)-1-methyl-5-nitroindole-2-carbonitrile
1-methyl-6(or 4)-nitro-3-phenylindole-2-carbonitrile
1-methyl-7-nitro-3-phenylindole-2-carbonitrile.

(V) Preparation of 2-aminomethylindole derivative [II]: In the present invention, a novel 2-aminomethylindole derivative [II] or its salt is prepared by reducing the indole-2-carbonitrile derivative [Xb]. The reduction is effected by reacting the indole-2-carbonitrile derivative [Xb] with a suitable reducing agent in a solvent.

The reducing agent, which may selectively reduce the cyano group to an aminomethyl group, without affecting the nitro group and/or halogen atom, can be used.

Examples of the reducing agent usable in the present invention are boron hydrides such as diborane, aluminum borohydride, calcium borohydride and sodium trimethoxy borohydride, and sodium borohydrides incorporated with metal halides such as aluminum halides. Particularly, the diborane is preferably used. When diborane is used as reducing agent gaseous diborane is introduced into the reaction mixture, or diborane is generated in the reaction system. For example, the reduction is effected by using diborane generated from sodium borohydride and boron trifluoride or mercurous chloride in the reaction system. In the reduction by diborane, solvent such as ether, tetrahydrofuran, dioxane, dyglyme or the like can be preferably used. Generally, the reaction is effected at a temperature within the range from room temperature to the boiling point of the solvent employed. After completion of the reaction, excess of reducing agent is decomposed, for example, by addition of water or an acid such as hydrochloric acid. The 2-aminomethylindole derivative [II] may be obtained as the corresponding salt by treatment on an inorganic acid such as hydrochloric, hydrobromic, sulfuric, nitric or phosphoric acid, or an organic acid such as acetic or formic acid. The 2-aminomethylindole derivatives [II] and salts thereof show hypoglycemic activity.

In the present invention, examples of the 2-aminomethylindole derivative [II] include the following compounds:

2-aminomethyl-1-ethyl-5-nitro-3-phenylindole
2-aminomethyl-1-methyl-5-nitro-3-phenylindole
2-aminomethyl-1-propyl-5-nitro-3-phenylindole
2-aminomethyl-3-(o-chlorophenyl)-1-methyl-5-nitroindole
2-aminomethyl-3-(o-fluorophenyl)-1-methyl-5-nitroindole
2-aminomethyl-3-(o-bromophenyl)-1-methyl-5-nitroindole
2-aminomethyl-3-(p-chlorophenyl)-1-methyl-5-nitroindole
2-aminomethyl-1-methyl-6(or 4)-nitro-3-phenylindole
2-aminomethyl-1-methyl-7-nitro-3-phenylindole.

and these hydrochlorides, hydrobromides, sulfates, phosphates and acetates.

(VI) Preparation of benzodiazepine derivative [I]: In accordance with the present process, the benzodiazepine derivative [I] is prepared by reacting the 2-aminomethylindole derivative [II], or the salt thereof, with an oxidizing agent.

In carrying out the process for preparing the benzodiazepine derivatives according to the present invention, a 2-aminomethylindole derivative represented by the Formula II or its salt is reacted with an appropriate oxidizing agent, for example, ozone, hydrogen peroxide, peracid (e.g. performic acid, peracetic acid and perbenzoic acid), chromic acid, potassium permanganate or the like. The oxidizing agent used in the process of the invention is not limited, however, only to those exemplified above. The reaction is generally readily effected at room temperature. Higher or lower temperature is sometimes found more satisfactory. Chromium trioxide is peferred as an oxidizing agent. The reaction may preferably be carried out in the presence of a solvent. The solvent is selected from water, methanol, ethanol, acetone, carbon tetrachloride, acetic acid, sulfuric acid or other inert solvents. The oxidizing agent is used in a stoichiometric amount or more.

In the case of the oxidation carried out by chromium trioxide in acetic acid, it is preferable to use 2 times or more equimolar amount of chromium trioxide at room temperature. A 2-aminomethylindole derivative or its salt such as hydrochloride, hydrobromide, sulfate, nitrate, acetate and the like is dissolved or suspended in a solvent and an oxidizing agent is added thereto with stirring. The reaction is generally completed within 24 hours. And the crude benzodiazepine derivative can be separated from the reaction mixture. The product may be purified, if desired, by recrystallization from an appropriate solvent such as ethanol, isopropanol and the like.

In the present invention, the benzodiazepine derivative [I] is treated with an inorganic acid such as hydrochloric, sulfuric, nitric or phosphoric acid, or an organic acid such as maleic, fumaric, succinic, formic or acetic acid, whereby the salt thereof is obtained.

In accordance with the present invention, the following benzodiazepine derivatives are obtained.

1-methyl-5-phenyl-7-nitro-1,3-dihydro-2H-1,4-benzodiazepine-2-one.
1-ethyl-5-phenyl-7-nitro-1,3-dihydro-2H-1,4-benzodiazepine-2-one.
1-methyl-5-(o-chlorophenyl)-7-nitro-1,3-dihydro-2H-1,4-benzodiazepine-2-one.
1-methyl-5-(o-fluorophenyl)-7-nitro-1,3-dihydro-2H-1,4-benzodiazepine-2-one.
1-propyl-5-phenyl-7-nitro-1,3-dihydro-2H-1,4-benzodiazepine-2-one.

The present invention will be illustrated in further detail with reference to examples, but these examples do not limit the scope of the invention.

EXAMPLE 1

To an ice cold solution of 150 g. of ethyl α-benzylacetoacetate in 700 ml. of ethanol is added portionwise 236 ml. of 50% aqueous potassium hydroxide solution under cooling, and then 1390 ml. of ice-water is added to the mixture. To this mixture is added dropwise, a cold diazonium salt solution prepared from 96 g. of p-nitroaniline, 278 ml. of conc hydrochloric acid, 278 ml. of water and a solution of 48 g. of sodium nitrite in 140 ml. of water, After addition, the reaction mixture is stirred for 10 min. under cooling, and extracted with ether. The ethereal layer is dried over sodium sulfate and the ether is evaporated to give 216 g. (96.6%) of ethyl phenylpyruvate p-nitrophenylhydrazone as an oil, which is partially solidified on standing overnight. The solid is recrystallized from ethanol to give the α isomer having M.P. 110–114° C.

IR cm.$^{-1}$: $\nu_{N-H}$ 3330 (in paraffin); $\nu_{C-O}$ 1729 (in paraffin).

Analysis.—Calcd. for $C_{17}H_{17}O_4N_3$ (percent): C, 62.38; H, 5.24; N, 12.83. Found (percent): C, 62.35; H, 5.15; N, 12.72.

To a solution of 111.1 g. of the said crude oily ethyl phenylpyruvate p-nitrophenylhydrozone in 400 ml. of ethanol is introduced dry gaseous hydrogen chloride for 40 min., while the temperature is arised to 64° C. The mixture is cooled and filtered to give 49.8 g. of the β-isomer of the ethyl phenylpyruvate p-nitrophenylhydrazone, M.P. 121–124° C. Recrystallization from ethanol gives the product having M.P. 125.5–129.5° C.

IR cm.$^{-1}$: $\nu_{N-H}$ 3220 (in paraffin); $\nu_{C-O}$ 1694 (in paraffin)

Analysis.—Calcd. for $C_{17}H_{17}O_4N_3$ (percent): C, 62.38; H, 5.24; N, 12.83. Found (percent): C, 62.44; H, 4.93; N, 12.64.

The following compounds are similarly prepared:

methyl phenylpyruvate p-nitrophenylhydrazone
tertiary-butyl phenylpyruvate p-nitrophenylhydrazone
ethyl phenylpyruvate m-nitrophenylhydrazone
ethyl (o-chlorophenyl) pyruvate p-nitrophenylhydrazone
ethyl (o-bromophenyl) pyruvate p-nitrophenylhydrazone
ethyl (o-fluorophenyl) pyruvate p-nitrophenylhydrazone
ethyl (p-chlorophenyl) pyruvate p-nitrophenylhydrazone
ethyl (m-chlorophenyl) pyruvate p-nitrophenylhydrazone.

EXAMPLE 2

To a solution of 22.5 g. of phenylpyruvic acid in 500 ml. of ethanol is added 21 g. of p-nitrophenylhydrazine, and the mixture is heated under reflux for 30 min. After the reaction is completed, the solvent is removed under reduced pressure to give phenylpyruvic acid p-nitrophenylhydrazone quantitatively as the mixture of the α and β form.

EXAMPLE 3

To a solution of 22.5 g. of phenylpyruvic acid in 500 ml. of ethanol is added 21 g. of p-nitrophenylhydrazine and the mixture was heated under reflux for 30 min. The resulting mixture is concentrated and then cooled. The precipitate is collected by fitration to give 12 g. of the α form of phenylpyruvic acid p-nitrophenylhydrazone. Recrystallization from ethanol gives pale yellow fine needles, M.P. 191–192° C. (decomp.).

IR cm.$^{-1}$: $\nu_{N-H}$ 3260 (in paraffin; $\nu_{C-O}$ 1669 (in paraffin)
UV: $\lambda_{max.}^{EtOH}$: 382 mμ (ε 31,100)

The filtrate is further concentrated to give 28 g. of the β form of phenylpyruvic acid p-nitrophenylhydrazone, M.P. 177–179° C. Recrystallization from benzene gives yellow fine needles, M.P. 185–186° C. (decomp.).

IR cm.$^{-1}$: $\nu_{N-H}$ 3310 (in paraffin; $\nu_{C-O}$ 1714 (in paraffin)
UV: $\lambda_{max.}^{EtOH}$: 372 mμ (28,800)

The following compounds are similarly prepared:

methyl phenylpyruvate p-nitrophenylhydrazone
tertiary-butyl phenylpyruvate p-nitrophenylhydrazone
ethyl phenylpyruvate p-nitrophenylhydrazone
phenylpyruvic acid m-nitrophenylhydrazone
phenylpyruvic acid o-nitrophenylhydrazone
phenylpyruvic acid N'methyl-p-nitrophenylhydrazone
(o-chlorophenyl)-pyruvic acid p-nitrophenylhydrazone
(o-bromophenyl)-pyruvic acid p-nitrophenylhydrazone
(o-fluorophenyl)-pyruvic acid p-nitrophenylhydrazone
(p-chlorophenyl)-pyruvic acid p-nitrophenylhydrazone
(m-chlorophenyl)-pyruvic acid p-nitrophenylhydrazone.

EXAMPLE 4

A suspension of 1 g. of the β-isomer of ethyl phenylpyruvate p-nitrophenylhydrazone in 40 ml. of 50% formic acid is heated under reflux for 4 hours. The solvent is removed under reduced pressure and the residue is washed a small amount of ethanol to give 0.75 g. of ethyl 5-nitro- 3-phenylindole-2-carboxylate, M.P. 235–237° C. (decomp.).

EXAMPLE 5

A mixture of 32.7 g. of ethyl phenylpyruvate p-nitrophenylhydrazone, 200 ml. of acetic acid and 200 ml. of conc. hydrochloric acid is heated under reflux for 2 hours. After cooling, the solid is collected by filtration, washed with water to give 23.8 g. of ethyl 5-nitro-3-phenylindole-carboxylate.

EXAMPLE 6

A suspension of 40 g. of phenylpyruvic acid p-nitrophenylhydrazone in 1.5 l. of 50% formic acid is heated under reflux for 4 hours. The solvent is removed under reduced pressure, and the residue is washed with ethanol to give 37 g. of 5-nitro-3-phenylindole-2-carboxylic acid. Recrystallization from ethanol gives orange yellow crystals, M.P. 299° C. (decomp).

The following compounds are similarly prepared:

methyl-5-nitro-3-phenylindole-2-carboxylate
tertiary-butyl 5-nitro-3-phenylindole-2-carboxylate
ethyl 6 (or 4)-nitro-3-phenylindole-2-carboxylate
7-nitro-3-phenylindole-2-carboxylic acid
3-(o-chlorophenyl)-5-nitroindole-2-carboxylic acid
3-(o-bromophenyl)-5-nitroindole-2-carboxylate acid
3-(o-fluorophenyl)-5-nitroindole-2-carboxylic acid
3-(p-chlorophenyl)-5-nitroindole-2-carboxylic acid
3-(m-chlorophenyl)-5-nitroindole-2-carboxylic acid.

EXAMPLE 7

A mixture of 7.1 g. of p-nitroaniline, 20.9 g. of conc. hydrochloric acid and 20 ml. of water is heated into a solution, and then cooled to 0° C. To the mixture is added dropwise a solution of 3.7 g. of sodium nitrite in 7 ml. of water below 0° C., and the mixture is stirred for 10 min. To the mixture is added 11.7 g. of sodium acetate and the mixture is stirred for 30 min. below 5° C. The resultant mixture is added dropwise to an ice-cold solution of 11 g. of ethyl α-benzylacetoacetate and 14.7 g. of anhydrous potassium acetate in methanol below 3° C. with stirring, and stirring is continued for additional 2 hours below 10° C. The reaction mixture is extracted with 200 ml. of ether. The ethereal layer is washed with water, dried over sodium sulfate and evaporated to an oil.

To the oily residue is added 50 ml. of isopropylalcohol and 50 ml. of conc. hydrochloric acid and the mixture is heated under reflux for 5 hours. After cooling the precipitate is collected by filtration, washed with water and dried to give 8.8 g. of ethyl 5-nitro-3-phenylindole-2-carboxylate.

EXAMPLE 8

A mixture of 7.1 g. of p-nitroaniline, 20.9 g. of conc. hydrochloric acid and 20 ml. of water is heated into a solution, and then cooled to 0° C. The mixture is diazotized by adding dropwise a solution of 3.7 g. of sodium nitrite in 7 ml. of water below 0° C. To the mixture is added 11.7 g. of sodium acetate and the mixture is stirred for 30 min. below 5° C. The resultant mixture is added dropwise to an ice-cold solution of 11 g. of ethyl α-benzylacetoacetate and 14.7 g. of anhydrous potassium acetate in methanol below 3° C. with stirring. The reaction mixture is stirred for 1 hour below 10° C., and heated under reflux for 4 hours. After cooling, the solid is separated and triturated with methanol and water to give ethyl phenylpyruvate p-nitrophenylhydrazone (14.5 g.), M.P. 108–117° C.

This hydrazone is heated with 45 ml. of isopropylalcohol and 45 ml. of conc. sulfuric acid. After reflux for 5 hours, the reaction mixture is cooled. The solid is collected by filtration, washed with water and dried to give 10.5 g. of ethyl 5 - nitro - 3 - phenylindole-2-carboxylate, M.P. 218° C.

Using the procedure of Examples 7 and 8, the following compounds are similarly prepared:

methyl 5-nitro-3-phenylindole-2-carboxylate
tertiary butyl 5-nitro-3-phenylindole-2-carboxylate
ethyl 6 (or 4)-nitro-3-phenylindole-2-carboxylate
ethyl 7-nitro-3-phenylindole-2-carboxylate
ethyl 3-(o-chlorophenyl)-5-nitroindole-2-carboxylate
ethyl 3-(o-bromophenyl)-5-nitroindole-2-carboxylate
ethyl 3-(o-fluorophenyl)-5-nitroindole-2-carboxylate
ethyl 3-(m-chlorophenyl)-5-nitroindole-2-carboxylate
ethyl 3-(p-chlorophenyl)-5-nitroindole-2-carboxylate.

EXAMPLE 9

To a solution of 22.5 g. of phenylpyruvic acid in 500 ml. of ethanol is added 21 g. of p-nitrophenylhydrazine. The mixture is refluxed for 30 min. and the solvent is evaporated. To the residue is added 1.5 l. of 50% aqueous formic acid and the mixture is heated under reflux for 4 hours. The solvent is removed under reduced pressure to the residue, which is washed with ethanol to yield quantitatively 5 - nitro-3-phenylindole-2-carboxylic acid, M.P. 297° C. (decomp). Recrystallization from ethanol gives orange yellow crystals, M.P. 299° C. (decomp).

*Analysis.*—Cald. for $C_{15}H_{10}O_4N_2$ (percent): C, 63.83; H, 3.57; N, 9.92. Found (percent): C, 63.40; H, 3.51; N, 10.02.

EXAMPLE 10

A mixture of 25 g. of phenylpyruvic acid, 23 g. of p-nitrophenylhydrazine, 480 ml. of acetic acid and 450 ml. of conc. hydrochloric acid is heated for 2 hours. The reaction mixture is cooled and then poured into ice-water. The precipitate is collected by filtration, washed with water and dried to give 40 g. of 5-nitro-3-phenylindole-2-carboxylic acid. A sample is recrystallized from ethanol to give crystals having M.P. 299° C. (decomp).

EXAMPLE 11

To a solution of 112.6 g. of p-nitrophenylhydrazine and 119.2 g. of phenylpyruvic acid in 2 l. of acetic acid is added 2 l. of conc. hydrochloric acid with stirring. The mixture is heated under reflux for 1 hour and then cooled. The precipitate is collected by filtration, washed with water and dried to yield 168.2 g. of 5-nitro-3-phenylindole-2-carboxylic acid, M.P. 287° C. (decomp).

Using the procedure of Examples 9 to 11, the following compounds are similarly prepared:

methyl 5-nitro-3-phenylindole-2-carboxylate
methyl 1-methyl-5-nitro-3-phenylindole-2-carboxylate
tertiary butyl 5-nitro-3-phenylindole-2-carboxylate
6 (or 4)-nitro-3-phenylindole-2-carboxylic acid
7-nitro-3-phenylindole-2-carboxylic acid
3-(o-chlorophenyl)-5-nitroindole-2-carboxylic acid
3-(o-chlorophenyl)-1-methyl-5-nitroindole-2-carboxylic acid
3-(o-bromophenyl)-5-nitroindole-2-carboxylic acid
3-(o-fluorophenyl)-5-nitroindole-2-carboxylic acid
3-(o-fluorophenyl)-1-methyl-5-nitroindole-2-carboxylic acid
3-(m-chlorophenyl)-5-nitroindole-2-carboxylic acid
3-(p-chlorophenyl)-5-nitroindole-2-carboxylic acid
1-ethyl-5-nitro-3-phenylindole-2-carboxylic acid
1-methyl-5-nitro-3-phenylindole-2-carboxylic acid.

EXAMPLE 12

To a solution of 2.7 g. of potassium hydroxide in 50 ml. of isopropyl alcohol and 1 ml. of water is added 6.2 g. of ethyl 5-nitro-3-phenylindole-2-carboxylate and the mixture is heated under reflux for 45 hours. The mixture is concentrated and the residue is dissolved in water. The cooled solution is made acidic with conc. hydrochloric acid under cooling. The precipitate formed is collected by filtration, washed thoroughly with water and dried to give 5.5 g. of 5-nitro-3-phenylindole-2-carboxylic acid, M.P. 287° C. (decomp.).

The following compounds are similarly prepared:

6 (or 4)-nitro-phenylindole-2-carboxylic acid
7-nitro-3-phenylindole-2-carboxylic acid
3-(o-chlorophenyl)-5-nitroindole-2-carboxylic acid
3-(o-chlorophenyl)-1-methyl-5-nitroindole-2-carboxylic acid
3-(o-bromophenyl)-5-nitroindole-2-carboxylic acid
3-(o-fluorophenyl)-5-nitroindole-2-carboxylic acid
3-(o-fluorophenyl)-1-methyl-5-nitroindole-2-carboxylic acid
3-(m-chlorophenyl)-5-nitroindole-2-carboxylic acid
3-(p-chlorophenyl)-5-nitroindole-2-carboxylic acid
1-methyl-5-nitro-3-phenylindole-2-carboxylic acid
1-ethyl-5-nitro-3-phenylindole-2-carboxylic acid.

EXAMPLE 13

A mixture of 28.2 g. of 5-nitro-3-phenylindole-2-carboxylic acid, 150 ml. of acetone and 45 g. of 50% aqueous potassium hydroxide solution is heated into a solution. To the solution is added dropwise 25.2 g. of dimethylsulfate with stirring and the mixture is heated under reflux for 1 hour. After the reaction is completed, the reaction mixture is cooled and the crystalline product is collected by filtration and washed with acetone and dissolved in 150 ml. of water under heating. The solution is acidified with hydrochloric acid and the precipitate is collected by filtration, washed with water and dried to yield 26.6 g. of 1-methyl-5-nitro-3-phenylindole-2-carboxylic acid, M.P. 250–251° C. (decomp.).

The following compounds are similarly prepared:

1-ethyl-5-nitro-3-phenylindole-2-carboxylic acid
1-methyl-6 (or 4)-nitro-3-phenylindole-2-carboxylic acid
1-methyl-7-nitro-3-phenylindole-2-carboxylic acid
3-(o-chlorophenyl)-1-methyl-5-nitroindole-2-carboxylic acid
3-(o-bromophenyl)-1-methyl-5-nitroindole-2-carboxylic acid
3-(o-fluorophenyl)-1-methyl-5-nitroindole-2-carboxylic acid
3-(m-chlorophenyl)-1-methyl-5-nitroindole-2-carboxylic acid
3-(p-chlorophenyl)-1-methyl-5-nitroindole-2-carboxylic acid.

EXAMPLE 14

A mixture of 6.2 g. of ethyl 5-nitro-3-phenylindole-2-carboxylate, 20 ml. of acetone and a solution of 5.3 g. of potassium hydroxide in 5 ml. of water is heated to dissolve and then cooled to 30° C. To the mixture is added dropwise 5.1 g. of dimethylsulfate and the mixture is heated under reflux for 4 hours. The acetone is removed under reduced pressure and the residue is dissolved in 300 ml. of water. The solution is treated on charcoal and filtered. The filtrate is acidified with hydrochloric acid under cooling and the precipitate is collected by filtration, washed thoroughly with water and dried to give 5.1 g. of 1-methyl-5-nitro-3-phenylindole-2-carboxylic acid, M.P. 260° C. (decomp.).

*Analysis.*—Calcd. for $C_{16}H_{12}O_4N_2$ (percent): C, 64.86; H, 4.08; N, 9.46. Found (percent): C, 65.08; H, 3.93; N, 9.29.

The following compounds are similarly prepared:

1-ethyl-5-nitro-3-phenylindole-2-carboxylic acid
1-methyl-6 (or 4)-nitro-3-phenylindole-2-carboxylic acid
1-methyl-7-nitro-3-phenylindole-2-carboxylic acid
3-(o-chlorophenyl)-1-methyl-5-nitroindole-2-carboxylic acid
3-(o-bromophenyl)-1-methyl-5-nitroindole-2-carboxylic acid
3-(o-fluorophenyl)-1-methyl-5-nitroindole-2-carboxylic acid
3-(m-chlorophenyl)-1-methyl-5-nitroindole-2-carboxylic acid
3-(p-chlorophenyl)-1-methyl-5-nitroindole-2-carboxylic acid.

EXAMPLE 15

A mixture of 163.1 g. of 5-nitro-3-phenylindole-2-carboxylic acid and 420 ml. of thionyl chloride is heated under reflux for 1 hour. The excess of thionyl chloride is removed under reduced pressure to give 5-nitro-3-phenylindole-2-carboxylic chloride quantitatively, which has M.P. 192.5–194.5° C. after recrystallization from methylene chloride.

EXAMPLE 16

A mixture of 23.7 g. of 1-methyl-5-nitro-3-phenylindole-2-carboxylic acid and 47.6 g. of thionyl chloride is heated under reflux for 1 hour. The excess of thionyl chloride is removed under reduced pressure to give 1-methyl-5-nitro-3-phenylindole-2-carboxylic acid as a yellow solid, quantitatively. Recrystallization from dichloroethane gives yellow prisms, M.P. 197–198° C.

Using the procedure of Examples 15 and 16, the following compounds are similarly prepared:

6 (or 4)-nitro-3-phenylindole-2-carboxylic chloride
7-nitro-3-phenylindole-2-carboxylic chloride
5-nitro-3-phenylindole-2-carboxylic bromide
3-(o-chlorophenyl)-5-nitroindole-2-carboxylic chloride
3-(o-bromophenyl)-5-nitroindole-2-carboxylic chloride
3-(o-fluorophenyl)-5-nitroindole-2-carboxylic chloride
3-(p1chlorophenyl)-5-nitroindole-2-carboxylic chloride
3-(m-chlorophenyl)-5-nitroindole-2-carboxylic chloride
1-ethyl-5-nitro-3-phenylindole-2-carboxylic chloride
1-propyl-5-nitro-3-phenylindole-2-carboxylic chloride.

EXAMPLE 17

A mixture of 27.5 g. of 5-nitro-3-phenylindole-2-carboxylic acid and 115 g. of thionyl chloride is heated under reflux for 30 min. The excess of thionyl chloride is removed under reduced pressure to the residue, which is dissolved in 400 ml. of anhydrous tetrahydrofuran. Gaseous ammonia is introduced into the solution under ice-cooling. The precipitate is collected by filtration, washed with water and then ethanol, and dried to give 14.5 g. of 5-nitro-3-phenylindole-2-carboxamide, M.P. 299–302° C. The tetrahydrofuran layer is concentrated under reduced pressure to dryness and the residue is washed with water, ethanol and ether successively, and dried to give an additional 12.1 g. of 5-nitro-3-phenylindole - 2 - carboxamide, M.P. 295.5–297° C.

Recrystallization from methanol affords the analytical sample, M.P. 302° C.

*Analysis.*—Calcd. for $C_{15}H_{11}O_3N_3$ (percent): C, 64.05; H, 3.94; N, 14.94. Found (percent): C, 64.13; H, 3.89; N, 14.15.

EXAMPLE 18

A mixture of 168.0 g. of 5-nitro-3-phenylindole-2-carboxylic acid and 710 g. of thionyl chloride is heated under reflux for 1.5 hours. The excess of thionyl chloride is removed under reduced pressure and the residue is suspended in 2 l. of dry toluene. Gaseous ammonia is introduced into the suspension for 2 hours. The precipitate is collected by filtration, washed with water and ether, and dried to give 160.4 g. of 5-nitro-3-phenylindole-2-carboxamide.

EXAMPLE 19

A mixture of 5.0 g. of 1-methyl-5-nitro-3-phenylindole-2-carboxylic acid and 20 g. of thionyl chloride is heated under reflux for 2 hours. The excess of thionyl chloride is removed under reduced pressure. The residue is suspended in 40 ml. of dry toluene and gaseous ammonia is introduced to the suspension under cooling. The yellow precipitate is collected by filtration, washed thoroughly with water and dried to give 3.2 g. of 1-methyl-5-nitro-3-phenyl-indole-2-carboxamide, M.P. 245–247° C.

Utilizing the procedure of Examples 17 to 19, the following compounds are similarly prepared:

6 (or 4)-nitro-3-phenylindole-2-carboxamide
7-nitro-indole-3-phenylindole-2-carboxamide
1-ethyl-5-nitro-3-phenylindole-2-carboxamide
1-propyl-5-nitro-3-phenylindole-2-carboxamide
3-(o-chlorophenyl)-5-nitroindole-2-carboxamide
3-(o-chlorophenyl)-1-methyl-5-nitroindole-2-carboxamide
3-(o-bromophenyl)-5-nitroindole-2-carboxamide
3-(o-fluorophenyl)-5-nitroindole-2-carboxamide
3-(o-fluorophenyl)-1-methyl-5-nitroindole-2-carboxamide
3-(p-chlorophenyl)-5-nitroindole-2-carboxamide
3-(m-chlorophenyl)-5-nitroindole-2-carboxamide.

EXAMPLE 20

A mixture of 28.1 g. of 5-nitro-3-phenylindole-2-carboxamide, 100 ml. of acetone and 23 g. of 50% aqueous potassium hydroxide solution is heated into a solution, and cooled to 40° C. To the mixture is added dropwise 18.9 g. of dimethyl sulfate with stirring. After addition, the mixture is refluxed for 1 hour and then is cooled in an ice bath. The precipitate is collected by filtration, washed with cold acetone followed by water, and dried to give 19.3 g. of 1-methyl-5-nitro-3-phenylindole-2-carboxamide, M.P. 248–249° C.

Methylation with methyl iodide, instead of dimethyl sulfate in the above procedure, is performed after the sodium salt has been formed by sodium hydride in dimethyl formamide to give 1-methyl-5-nitro-3-phenylindole-2-carboxamide, M.P. 247–249° C.

The following compounds are similarly prepared:

1-ethyl-5-nitro-3-phenylindole-2-carboxamide
1-propyl-5-nitro-3-phenylindole-2-carboxamide
3-(o-fluorophenyl)-1-methyl-5-nitroindole-2-carboxamide
3-(o-chlorophenyl)-1-methyl-5-nitroindole-2-carboxamide
3-(p-chlorophenyl)-1-methyl-5-nitroindole-2-carboxamide.

EXAMPLE 21

A mixture of 13.5 g. of 5-nitro-3-phenylindole-2-carboxamide and 59 g. of phosphorous oxychloride is heated under reflux for 30 min. The reaction mixture is poured over crushed ice with stirring. The precipitate is collected by filtration, washed with water and dried to give 11 g. of 5-nitro-3-phenylindole-2-carbonitrile, M.P. 261° C. Recrystallization from methanol gives pale yellow needles, M.P. 263–264° C.

*Analysis.*—Calcd. for $C_{15}H_9O_2N_3$ (percent): C, 68.44; H, 3.45; N, 15.95. Found (percent): C, 68.61; H, 3.07; N, 16.19.

EXAMPLE 22

A mixture of 1.5 g. of 1-methyl-5-nitro-3-phenylindole-2-carboxamide and 8 g. of phosphorous oxychloride is heated under reflux for 20 min. The mixture is cooled and poured over crushed ice. The solid is collected by filtration, washed with water and dried to give 1.4 g. of 1-methyl-5-nitro-3-phenylindole-2-carbonitrile, M.P. 218–220° C.

Using the procedure of Examples 21 and 22, the following compounds are similarly prepared:

1-ethyl-5-nitro-3-phenylindole-2-carbonitrile
1-propyl-5-nitro-3-phenylindole-2-carbonitrile
6 (or 4-)-nitro-3-phenylindole-2-carbonitrile
7-nitro-3-phenylindole-2-carbonitrile
3-(o-chlorophenyl)-5-nitroindole-2-carbonitrile
3-(o-chlorophenyl)-1-methyl-5-nitrile-2-carbonitrile
3-(o-bromophenyl)-5-nitroindole-2-carbonitrile
3-(o-fluorophenyl)-5-nitroindole-2-carbonitrile
3-(o-fluorophenyl)-1-methyl-5-nitroindole-2-carbonitrile
3-(p-chlorophenyl)-1-methyl-5-nitroindole-2-carbonitrile
3-(m-chlorophenyl)-5-nitroindole-2-carbonitrile.

EXAMPLE 23

To an ice-cooled suspension of 20 g. of 5-nitro-3-phenyl-indole-2-carbonitrile in 70 ml. of acetone is added a solution of 14.3 of potassium hydroxide in 14.3 ml. of water. To the resultant solution is added dropwise 18.6 g. of dimethyl sulfate. The temperature rises to 43° C. After addition, the mixture is stirred for 30 min. and cooled. The precipitate is collected by filtration, washed with water and dried to give 20.7 g. of 1-methyl-5-nitro-3-phenylindole-2-carbonitrile, M.P. 222–223° C. Recrystallization gives an analytical sample, M.P. 222.5–223.5° C.

Methylation with methyl iodide, instead of dimethyl sulfate in the above procedure, is performed after sodium salt has been formed by sodium hydride in dimethylformamide to give 1-methyl-5-nitroindole-2-carbonitrile, M.P. 222–223° C.

The following compounds are similarly prepared:

1-ethyl-5-nitro-3-phenylindole-2-carbonitrile
1-propyl-5-nitro-3-phenylindole-2-carbonitrile
3-(o-chlorophenyl)-1-methyl-5-nitroindole-2-carbonitrile
3-(o-fluorophenyl)-1-methyl-5-nitroindole-2-carbonitrile
3-(p-chlorophenyl)-1-methyl-5-nitroindole-2-carbonitrile
1-methyl-6 (or 4)-nitro-3-phenylindole-2-carbonitrile
1-methyl-7-nitro-3-phenylindole-2-carbonitrile.

EXAMPLE 24

To a suspension of 135.0 g. of 1-methyl-5-nitro-3-phenyl-indole-2-carbonitrile in 2.5 l. of dry tetrahydrofuran is added 46.4 g. of powdered sodium borohydride. To the mixture is added dropwise a solution of 231 g. of boron trifluoride-etherate in 500 ml. of dry tetrahydrofuran with stirring for over 30 min. After addition, stirring is continued for additional 2 hours. To the reaction mixture is added dropwise 600 ml. of water and then 600 ml. of conc. hydrochloric acid with stirring under ice-cooling. The resultant mixture is neutralized with 1.1 l. of ammonium hydroxide. The organic layer is separated and the aqueous phase is extracted with ether. The extracts are combined with the organic layer, dried over sodium sulfate and evaporated under reduced presure. The residue is heated to reflux with 1500 ml. of ethanol. After cooling, the solid is removed by filtration. The filtrate is concentrated and cooled with ice. A precipitate which produced is collected by filtration and dried to give 108.3 g. of crude 2-aminomethyl-1-methyl-5-nitro - 3 - phenylindole. This crude product is used in the next step without further purification.

An analytical sample is obtained as following: The crude product (10 g.) is heated with 100 ml. of glacial acetic acid into a solution. The solution is cooled and the resultant crystals are collected by filtration, washed with glacial acetic acid and the carbon tetrachloride and dried to give 5.5 g. of yellow needles, M.P. 196–198° C. Recrystallization from isopropylalcohol gives yellow plates, M.P. 196–198° C.

The crystals are neutralized with ammonia water and extracted with chloroform. The extracts are combined, dried over sodium sulfate and concentrated to give 2-aminomethyl-1-methyl-5-nitro-3-phenylindole, M.P. 157–158° C.

IR: $\nu_{max}^{Paraffin}$: 3390, 1612, 1602, 1570, 1510 cm.$^{-1}$

EXAMPLE 25

To a solution of 6.1 g. of crude 2-aminomethyl-1-methyl-5-nitroindole obtained in Example 22 in 200 ml. of ethanol is added 20 ml. of 20% ethanolic hydrogen chloride. The mixture is cooled and the precipitate is collected by filtration, washed with hot ethanol and dried to give 4.4 g. of 2-aminomethyl-1-methyl-5-nitro-3-phenylindole hydrochloride, M.P. 270.5–273° C.

*Analysis.*—Calcd. for $C_{16}H_{15}O_2N_3HCl$ (percent): C, 60.48; H, 5.08. Found (percent): C, 60.28; H, 5.26.

IR: $\nu_{max.}^{Paraffin}$: 1616, 1607, 1570, 1520 cm.$^{-1}$

EXAMPLE 26

To a suspension of 73.9 g. of 1-methyl-5-nitro-3-phenylindole-2-carbonitrile in 1.5 l. of dry tetrahydrofuran is added dropwise a solution of 126 g. of boron trifluoride-etherate in 220 ml. of dry tetrahydrofuran with stirring for 2 hours. After addition, stirring is continued for additional 3 hours. To the reaction mixture is added dropwise 370 ml. of water and then 370 ml. of conc. hydrochloric acid with stirring under ice-cooling.

The resulting precipitate is collected by filtration, washed with water followed by ethanol, and dried to give 56.3 g. of crude 2-aminomethyl-1-methyl-5-nitro-3-phenylindole hydrochloride, M.P. 263–267° C.

Using the procedures of Examples 24 to 26, the following compounds are similarly prepared:

2-aminomethyl-1-ethyl-5-nitro-3-phenylindole
2-aminomethyl-1-propyl-5-nitro-3-phenylindole
2-aminomethyl-3-(o-chlorophenyl)-1-methyl-5-nitroindole
2-aminomethyl-3-(o-fluorophenyl)-1-methyl-5-nitroindole
2-aminomethyl-3-(o-bromophenyl)-1-methyl-5-nitroindole
2-aminomethyl-3-(p-chlorophenyl)-1-methyl-5-indoleindole
2-aminomethyl-1-methyl-6 (or 4)-nitro-3-phenylindole
2-aminomethyl-1-methyl-7-nitro-3-phenylindole and these hydrochlorides, hydrobromides, sulfates, phosphates and acetates.

EXAMPLE 27

To a suspension of 6.5 g. of 2-aminomethyl-1-methyl-5-nitro-3-phenylindole in 65 ml. of glacial acetic acid is added dropwise a solution of 6.5 g. of chromic anhydride in 6.5 of chromic anhydride in 6.5 ml. of water at 20° C. with stirring. The mixture is stirred at room temperature overnight and thereto is added 195 ml. of water. To the mixture is added dropwise 100 ml. of 28% ammonia water with stirring under cooling. The resultant precipitate is collected by filtration, washed with water and dried to give 5.9 g. of a crude product having M.P. 135–140° C. Fractional recrystallization from ethanol gives 3.8 g. of 1-methyl-7-nitro-5-phenyl-1,3-dihydro-2H-1,4-benzodiazepine-2-one as yellow plates, M.P. 153–156° C. Further recrystallization from the same solvent gives pale yellow plates having M.P. 156–156.5° C.

EXAMPLE 28

To a mixture of 8.1 g. of 2-aminomethyl-1-methyl-5-nitro-3-phenylindole hydrochloride and 80 ml. of glacial acetic acid is added dropwise a solution of 8 g. of chromic anhydride in 8 ml. of water at 23–30° C. with stirring. The mixture is stirred at room temperature overnight. To the mixture is added 240 ml. of water and then 125 ml. of 28% aqueous ammonia dropwise with stirring under cooling. The precipitate is collected by filtration, washed water water. Recrystallization from 70 ml. of ethanol gives 4.1 g. of 1-methyl-7-nitro-5-phenyl-1,3-dihydro-2H-1,4-benzodiazepine-2-one, M.P. 156–157° C.

EXAMPLE 29

To a suspension of 10 g. of 2-aminomethyl-1-methyl-5-nitro-3-phenylindole hydrochloride and 100 ml. of glacial acetic acid is added dropwise a solution of 8.8 g. of chromic anhydride in 8.8 ml. of water at 18–21° C. with stirring. The mixture is stirred at room temperature overnight. The resultant precipitate is collected by filtration, washed with glacial acetic acid and dried to give 10.5 g. of yellow brown solid, M.P. 181–183° C. The solid (9.5 g.) is added to dilute aqueous ammonia with stirring. The precipitate is collected by filtration, washed with water and dried to give 5.6 g. of 1-methyl-7-nitro-5-phenyl-1,3-dihydro-2H-1,4-benzodiazepine-2-one, M.P. 149–153° C. Treatment with active carbon and recrystallization from ethanol gives 3.85 g. of almost colorless plates, M.P. 156–158° C.

EXAMPLE 30

A current of ozonized oxygen is passed through a mixture of 10.0 g. of 2-aminomethyl-1-methyl-5-nitro-3-phenylindole and 120 ml. of glacial acetic acid at 20–25° C. for 3.5 hours. The reaction mixture is added dropwise to a solution of 150 ml. of 28% ammonia water and 300 ml. of water under cooling. The mixture is extracted with chloroform. The combined extracts are washed with water, dried over sodium sulfate and evaporated under reduced pressure. The residue is dissolved in 100 ml. of hot ethanol. After cooling, an insoluble material is removed by decantation. The ethanol solution is concentrated under reduced pressure. The residue is chromatographed on silica gel and eluted with benzene to give 2-methylamino-5-nitro-benzophenone. Further elution with chloroform gives 1-methyl-7-nitro-5-phenyl-1,3-dihydro-2H-1,4-benzodiazepine-2-one.

EXAMPLE 31

To a mixture of 98 g. of chromic anhydride, 98 ml. of water and 980 ml. of glacial acetic acid is added portionwise 98 g. of 2-aminomethyl-1-methyl-5-nitro-3-phenyl-indole at 25–26° C. with stirring. The mixture is stirred at room temperature for 18 hours. The reaction mixture is added dropwise to an ice-cold solution of 1.3 l. of 28% ammonia water and 6 l. of ice-water below 10° C. The precipitate is collected by filtration, washed with water and dried to give 163.9 g. of crude 1-methyl-7-nitro-5-phenyl-1,3-dihydro - 2H-1,4-benzodiazepine-2-one, M.P. 133–140° C.

This crude product (10 g.) is dissolved in 20 ml. of dimethylformamide. The solution is treated on active carbon and filtered. Gaseous hydrogen chloride is passed throught the filtrate.

The resultant precipitate is collected by filtration, washed with dimethylformamide and ethanol, and dried to give 1-methyl-7-nitro-5-phenyl-1,3-dihydro-2H-1,4-benzodiazepine-2-one hydrochloride, M.P. 227–234° C. (decomp.). The hydrochloride is suspended in 30 ml. of water and neutralized with ammonia water with stirring to give 6.5 g. of 1-methyl-7-nitro-5-phenyl-1,3-dihydro-2H-1,4-benzodiazepine-2-one. Recrystallization from ethanol gives 5.7 g. of the pure product, M.P. 156–158° C.

Using the procedure of Examples 27 to 31, the following compounds are similarly prepared:

1-ethyl-7-nitro-5-phenyl-1,3-dihydro-2H-1,4-benzodiazepine-2-one
1-methyl-8-nitro-5-phenyl-1,3-dihydro-2H-1,4-benzodiazepine-2-one
1-methyl-9-nitro-5-phenyl-1,3-dihydro-2H-1,4-benzodiazepine-2-one 5-(o-chlorophenyl)-1-methyl-7-nitro-1,3-dihydro-2H-1,4-benzodiazepine-2-one 5-(o-bromophenyl)-1-methyl-7-nitro-1,3-dihydro-2H-1,4-benzodiazepine-2-one 5-(o-fluorophenyl)-1-methyl-7-nitro-1,3-dihydro-2H-1,4-benzodiazepine-2-one 5-(p-chlorophenyl)-1-methyl-7-nitro-1,3-dihydro-2S-1,4-benzodiazepine-2-one

We claim:
1. A 2-aminomethylindole derivative represented by the formula:

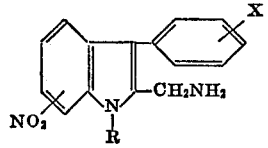

[II]

wherein R signifies an alkyl group having 1–4 carbon atoms; and X signifies a hydrogen or halogen atom.

2. A 2-aminomethylindole derivative according to claim 1 which is 1-methyl-2-amino-5-nitro-3-phenylindole represented by the formula:

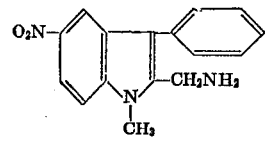

References Cited
UNITED STATES PATENTS
3,466,287   9/1969   Archer _____ 260—268

JOSEPH A. NARCAVAGE, Primary Examiner